United States Patent
Sasabe et al.

(10) Patent No.: US 6,730,711 B2
(45) Date of Patent: May 4, 2004

(54) METHOD FOR PRODUCTION OF POROUS CROSS-LINKED POLYMER MATERIAL

(75) Inventors: Masazumi Sasabe, Kakogawa (JP); Kenji Kadonaga, Takatsuki (JP); Hiroki Inoue, Kyoto (JP); Akiko Mitsuhashi, Sanda (JP); Hirotama Fujimaru, Himeji (JP); Masatoshi Yoshida, Nara (JP); Masuji Izubayashi, Nishinomiya (JP); Kazutomo Takahashi, Moriyama (JP)

(73) Assignees: Nippon Shokubai Co., Ltd., Osaka (JP); The Proctor & Gamble Company, West Chester, OH (US)

( * ) Notice: Subject to any disclaimer, the term of this patent is extended or adjusted under 35 U.S.C. 154(b) by 16 days.

(21) Appl. No.: 10/149,602

(22) PCT Filed: Oct. 23, 2001

(86) PCT No.: PCT/JP01/09290
§ 371 (c)(1), (2), (4) Date: Jun. 13, 2002

(87) PCT Pub. No.: WO02/34798
PCT Pub. Date: May 2, 2002

(65) Prior Publication Data
US 2002/0193456 A1 Dec. 19, 2002

(30) Foreign Application Priority Data
Oct. 24, 2000 (JP) .................................. 2000-324550

(51) Int. Cl.$^7$ ................................................ C08J 9/28
(52) U.S. Cl. ................................................ 521/64
(58) Field of Search ........................................ 521/64

(56) References Cited

U.S. PATENT DOCUMENTS

| | | | | |
|---|---|---|---|---|
| 5,334,621 A | * | 8/1994 | Beshouri |
| 5,459,176 A | * | 10/1995 | Bae et al. |
| 5,496,589 A | * | 3/1996 | Igarashi et al. |
| 6,207,724 B1 | * | 3/2001 | Hird et al. |
| 6,444,716 B1 | * | 9/2002 | Hird et al. |

FOREIGN PATENT DOCUMENTS

| | | | | |
|---|---|---|---|---|
| DE | 44 10 041 A | * | 9/1994 |
| EP | 0 239 360 A2 | * | 9/1987 |
| EP | 0 870 785 A1 | * | 10/1998 |
| JP | 62 250002 | * | 10/1987 |
| JP | 07 149993 A | * | 6/1995 |
| WO | WO 96/21474 | * | 7/1996 |
| WO | WO 96/21505 | * | 7/1996 |
| WO | WO 97/45457 | * | 12/1997 |
| WO | WO 00/35961 | * | 6/2000 |

* cited by examiner

Primary Examiner—Morton Foelak
(74) Attorney, Agent, or Firm—Fish & Richardson P.C.

(57) ABSTRACT

A method for the production of a porous cross-linked polymer material by the polymerization of an HIPE containing a cross-linking agent, characterized by the fact at least one species of the cross-linking agent is a compound having a double bond equivalent f not less than 120 g/mol. The cross-linking agent is preferred to be a compound possessed of an alkylene oxide moiety or a vinyl polymer containing not less than two polymerizing double bonds in the molecular unit. Thus, it is made possible to produce a porous cross-linked polymer material excellent in absorbency and flexibility, permit the HIPE to be polymerized in a short time, and therefore improve the efficiency of production.

6 Claims, 1 Drawing Sheet

METHOD FOR PRODUCTION OF POROUS CROSS-LINKED POLYMER MATERIAL

TECHNICAL FIELD

This invention relates to a method for producing a porous cross-linked polymer material by polymerizing a water in oil type high internal phase emulsion (hereinafter referred to as "HIPE") containing a specific cross-linking agent, and more particularly to a method for producing a porous cross-linked polymer material excellent in absorbancy, mechanical strength, and flexibility by incorporating a compound having a double bond equivalent of not less than 120 g/mol.

BACKGROUND ART

For the production of a porous substance formed of uniform open cells having a microscopic diameter, it has been known to obtain a polymer in the HIPE in the presence of a specific surfactant has been known. The "high internal phase emulsion" as used herein is generally construed as an emulsion containing a dispersion phase at a ratio exceeding 70 vol. % based on the total volume of the emulsion (K. J. Lissant, Journal of Colloid and Interface Science, Vol.22, 462(1966)). U.S. Pat. No. 5,334,621, for example, discloses a method for producing a porous material by cross-link polymerizing a polymerizing monomer contained in such an HIPE (hereinafter referred to as "HIPE" method).

This HIPE method produces a porous material by preparing an HIPE containing (i) a polymerizing monomer mixture containing an oil-soluble vinyl monomer and a cross-linking monomer having not less than two functional groups in the molecular unit, (ii) a water phase occupying 90 wt. %, preferably 95 wt. %, and particularly preferably 97 wt. %, of the emulsion, (iii) a surfactant such as a sorbitan fatty ester and a glycerol monofatty ester, and (iv) a polymerization initiator and heating the HIPE thereby polymerizing and cross-linking the HIPE. Generally, a porous cross-linked polymer is produced by mixing the oil phase containing at least the components (i) and (iii) mentioned above and the water phase of (ii), emulsifying the resultant mixture thereby preparing an HIPE, adding to the HIPE the initiator of (iv) and, at the same time, heating them to a temperature optimal for polymerization thereby initiating polymerization. According to this HIPE method, since the porous material formed of reticular open cells is produced by the reversed-phase emulsion polymerization, the produced porous material is possessed of characteristic properties as low density, absorbancy, water retaining property, heat insulating property, and sound insulating property.

The porous cross-linked polymer material of this quality is a highly bulky substance. For the purpose of producing, transporting, and storing this bulky material, it is required to possess ample flexibility enough to resume the original shape after it has been placed in a compressed or bent state for along time. When the porous cross-linked polymer material is used as an absorbent for humor, it demands excellent absorbancy.

An invention which, with a view to improving the properties of absorbancy and flexibility, has originated in the discovery that this improvement depends on the distribution of pore diameters in the HIPE has been disclosed in the official gazette of National Unexamined Patent Publication 10-521,187. This official gazette discloses a method for producing a porous cross-linked polymer material by using divinyl benzene and 1,6-hexadiol diacrylate as cross-linking monomers, emulsifying them in a specific procedure thereby obtaining an HIPE, and then polymerizing this HIPE at a temperature of 65° C. for 18 hours.

The production of a macromolecular compound possessed of such a reticular texture from the HIPE is accomplished by the formation of a three-dimensionally cross-linked structure. As a technique for obtaining a low density porous cross-linked polymer material possessed of an effective degree of elasticity, the official gazette of JP-A-62-250, 002, for example, discloses a method which is characterized by using a specific polymerizing monomer and fixing an average pore diameter in a specific range. This method obtains an elastic cross-linked porous polymer, for example, by combining up to 50 wt. % of styrene and at least 50 wt. % of an alkyl acrylate or methacrylate thereby forming an emulsion under controlled treating conditions, and polymerizing the monomer mixture.

The method disclosed in the official gazette of National Unexamined Patent Publication 10-512,187 as targeted at improving the quality of a porous cross-linked polymer material by controlling the distribution of pore diameters, however, fails to constitute a method to cure the HIPE in a short time because it requires several hours for polymerization and fails to complete a product in a short time.

When a porous cross-linked polymer material is produced by polymerizing the HIPE, the mechanical strength of the produced porous cross-linked polymer material is varied by difference of the polymerization time. Generally, the polymerization completed in a short time tends to degrade the mechanical strength of the produced porous cross-linking polymer material because the formation of a structure of the material is insufficient. Thus, the produced porous cross-linked polymer material possibly sustains a crack due to a break or a bend at the stage of fabrication and the stage for storage and transportation. If the polymerization time is simply elongated, the added time will result in a lowering the production efficiency. In this respect, by simply specifying the polymerizing monomer to be used as disclosed in the official gazette of JP-A-62-250,002, it is still difficult to obtain a porous cross-linked polymer material which secures ample absorbancy and excels in flexibility.

DISCLOSURE OF THE INVENTION

The present inventors have studied in detail the process for the production of a porous cross-linked polymer material by the HIPE method and have consequently discovered that a porous cross-linked polymer material excelling in mechanical strength and in absorbancy as well can be produced by using a specific compound as a cross-linking agent. This invention has been perfected as a result. Specifically, this invention is aimed at providing the following item (1).

(1) A method for the production of a porous cross-linked polymer material by the polymerization of an HIPE containing a cross-linking agent, characterized by at least one kind of said cross-linking agent being a compound having a double bond equivalent of not less than 120 g/mol.

According to this invention, a porous cross-linked polymer material excelling in absorbancy and flexibility can be produced by incorporating in the monomer mixture a compound having a double bond equivalent of not less than 120 g/mol. Moreover, by using the compound having a double bond equivalent of not less than 120 g/mol, it is made possible to adjust the cross-link density and advance the occurrence of the gel point and eventually curtail the polymerizing time. This fact, when the HIPE is continuously polymerized in the form of a sheet, contributes to the reduction of the space for production because the production time can be shortened and, at the same time, the apparatus for polymerization can be decreased in size. Since the produced porous cross-linked polymer material excels in flexibility, it sustains a crack only sparingly when it is subjected to such additional treatment as the impregnation in a chemical agent or when it is folded or bent during storage or transportation.

Figure 1:
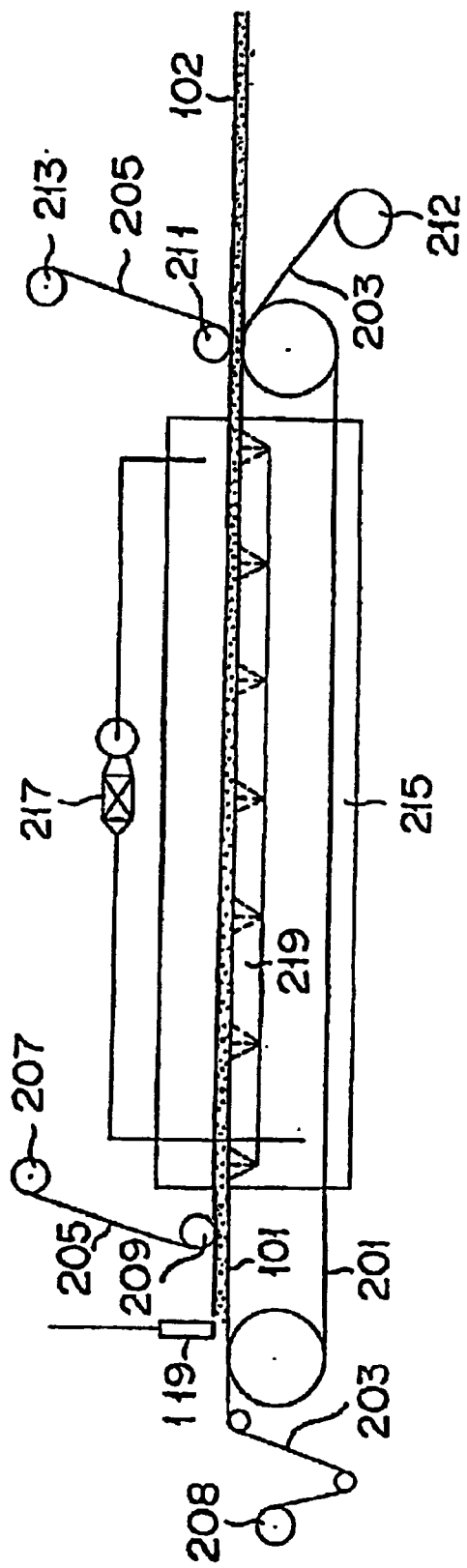
FIG. 1 is a schematic side view illustrating a typical mode of embodiment of an apparatus for continuous polymerization which is one of preferred polymerization devices in the method for production of a porous cross-linked polymer material according to this invention.

101 . . . HIPE, 102 . . . porous cross-linked polymer, 119 . . . HIPE supplying part, 201 . . . conveyor belt of endless belt type, 202,205 . . . sheet material, 207, 208 . . . unwinding roller, 209,211 . . . roller, 212,213 . . . rewinding roller, 215 . . . polymerizing oven, 217 . . . heating means, 219 . . . hot water shower

BEST MODE OF EMBODYING THE INVENTION

This invention concerns a method for the production of a porous cross-linked polymer material by the polymerization of an HIPE containing a cross-linking agent, characterized by the fact that at least one kind of the cross-linking agent is a compound having a double bond equivalent of not less than 120 g/mol. Since the production of a porous cross-linked polymer material excelling in absorbancy by the polymerization of an HIPE requires the polymerizing monomer to be cross-linked in three-dimension, the HIPE contains a cross-linking agent as an essential component. This invention intends to obtain a porous cross-linked polymer material having the intervals between cross-links properly adjusted and excelling in absorbancy and flexibility by using as the cross-linking agent a compound having a double bond equivalent of not less than 120 g/mol. Further, the use of the compound having a double bond equivalent of not less than 120 g/mol results in adjusting the intervals between the cross-links, an increase in the density of cross-links rarely impairs the flexibility of the polymer. As compared with the polymerization using a compound having a double bond equivalent of less than 120 g/mol, therefore, the polymerization allows incorporation in the monomer mixture of the cross-linking agent in a larger amount and use of a cross-linking agent having a larger number of double bonds in the molecular unit. It has been ascertained that the HIPE can be made to succumb more easily to gelation and the polymerization time can be curtailed as a result. Now, this invention will be described in detail below.

[I] Preparation of HIPE (1) Raw Material Used for HIPE

The raw materials to be used for an HIPE are only required to include (a) a polymerizing monomer, (b) a cross-linking monomer, and (c) a surfactant as essential components for forming an oil phase and (d) water as an essential component for a water phase. They may optionally include further (e) a polymerization initiator, (f) a salt, and (g) other additive as arbitrary components for forming an oil phase and/or a water phase.

(a) Polymerizing Monomer

The monomer composition essential for the composition of the HIPE mentioned above is a polymerizing monomer possessing one polymerizing unsaturated group in the molecule thereof. Though it does not need to be particularly discriminated but has only to be capable of being polymerized in a dispersion or a water-in-oil type high internal phase emulsion and allowed to form an emulsion consequently. It preferably contains a (meth)acrylic ester at least partly, more preferably contains not less than 20 mass % of the (meth) acrylic ester, and particularly preferably contains not less than 35 mass % of the (meth)acrylic ester. When the (meth)acrylic ester is contained as a polymerizing monomer possessing one polymerizing unsaturated group in the molecule thereof proves advantageous because the produced porous cross-linked polymer abounds in flexibility and toughness.

As concrete examples of the polymerizable monomer which is used effectively in this invention, allylene monomers such as styrene; monoalkylene allylene monomers such as ethyl styrene, α-methyl styrene, vinyl toluene, and vinyl ethyl benzene; (meth)acrylic esters such as methyl (meth)acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizable monomers may be used either singly or in the form of a combination of two or more members.

The content of the polymerizing monomer is preferred to be in the range of 10–99.9 mass %, based on the total mass of the monomer composition consisting of the polymerizing monomer and a cross-linking monomer. The reason for this range is that the produced porous cross-lined polymer is enabled to acquire pores of minute diameters. The range is more preferably 30–99 mass % and particularly preferably 30–70 mass %. If the content of the polymerizing monomer is less than 10 mass %, the produced porous cross-linked polymer will be possibly friable and deficient in water absorption ratio. Conversely, if the content of the polymerizing monomer exceeds 99.9 mass %, the porous cross-linked polymer consequently produced will be possibly deficient in strength and elastic recovery power and incapable of securing sufficient amount of water absorbed and sufficient velocity of water absorption.

(b) Cross-linking Agent

This invention is characterized by using as a cross-linking agent a compound having a double bond equivalent of not less than 120 g/mol. It has been known, in the production of a porous cross-linked polymer material by the polymerization of an HIPE, to use as part of the monomer component a cross-linking agent such as divinyl benzene. It has been also known that the performance of the porous cross-linked polymer material is varied by the cross-linking agent. Under the production conditions for making the polymerization complete in a short time by the use of divinyl benzene, however, the porous cross-linked polymer material becomes a friable material which is deficient in such physical properties as flexibility and compressive strength. This invention is capable of producing a porous cross-linked polymer material excelling in absorbancy, compressive strength, and flexibility in a short time by using a compound having a double bond equivalent of not less than 120 g/mol. Properly, the double bond equivalent is in the range of 120–10,000 g/mol, preferably 140–5,000 g/mol. If the double bond equivalent falls short of 120 g/mol, the shortage will possibly tighten excessively the texture near the points of cross-linkage and render the porous cross-linked polymer material rigid and friable.

Generally, in the homopolymerization of a polyfunctional vinyl monomer or the copolymerization thereof with a monovinyl monomer, a prepolymer having a linear structure containing a pendant vinyl group or a partially looped'structure resulting from intramolecular cyclization is formed during the initial stage of polymerization. As the polymerization advances, the cross-linking reaction between the growth radical and the pendant vinyl group in the prepolymer is activated to convert the prepolymer into a macromolecular compound having a highly branched texture and compel the polymerization solution to gain in viscosity. This variation of the polymerization system, particularly the growing trend of viscosity, accelerates abruptly with the approach of a certain polymerization ratio. Eventually, this polymerization forms a gel which is a mega-molecule possessed of insoluble three-dimensional reticular structure and the polymerization solution is deprived of flowability. The polymerization ratio at which the gel begins to form in the system is referred to as "gel point." The polymerization reaches the gel point earlier in proportion as the number of functional groups in the cross-linking agent is heightened and the amount of the cross-linking agent to be incorporated in the monomer mixture is increased. When the cross-linking agent to be used has a double bond equivalent of less than 120 g/mol and has a large number of functional groups or it is incorporated in a large amount in the monomer mixture, the possibility of the produced polymer being degraded in flexibility increases frequently. This invention, because of the use of a compound having a double bond equivalent of not less than 120 g/mol, allows the cross-linking agent to be incorporated in an increased amount without any fear of inducing the degradation of the flexibility, permits formulation of a composition using a cross-linking agent having an increased number of functional groups and expediting the occurrence of the gel point, and eventually promises a reduction in the polymerization time.

The expression "double bond equivalent" as used herein is construed as denoting the quotient of the division, molecular weight of cross-linking agent/number of double bonds in the molecular unit.

The cross-linking agent to be used in this invention does not need to be particularly discriminated but is only required to be a compound having a double bond equivalent of not less than 120 g/mol. As concrete examples of the cross-linking agent, i) a compound possessed of not less than two double bonds in the side chain or at the terminal and containing an alkylene oxide moiety; ii) a vinyl polymer possessed of not less than two double bonds in the side chain or at the terminal; iii) a compound obtained by addition polymerizing to an active hydrogen-containing amino group contained in a polyalkylene imide an alkylene oxide in an amount exceeding the equivalent of the active hydrogen of the amino group and then binding (meth)acrylic acid by ester linkage to the resultant polyamine polyalkylene oxide compound; iv) a compound obtained by bonding not less than two molecules of an unsaturated carboxylic acid monomer by ester linkage to an oligo or a polyester possessed of a hydroxyl group; and v) a compound obtained by bonding not less than two molecules of an unsaturated carboxylic acid monomer by urethane linkage to an oligo or a polyurethane may be cited. These cross-linking agents are invariably possessed of flexibility inherently and capable of imparting flexibility, compressive strength, and absorbancy to the porous cross-linked polymer material. Among them, the cross-linking agents of i) and ii.) prove particularly advantageous in respect that they excel in the effect of imparting flexibility and absorbancy to the porous cross-linked polymer material and the effect of curtaining the polymerization time of an HIPE. Now, these cross-linking agents will be described below.

i) As a concrete example of the compound possessed of not less than two double bonds in the side chain or at the terminal and containing an alkylene oxide moiety, a compound obtained by adding an alkylene oxide to a polyhydric alcohol having a valency of at least two and then bonding an unsaturated carboxylic acid monomer to the resultant adduct by ester linkage may be cited.

The polyhydric alcohols include ethylene glycol, propylene glycol, polyethylene glycol, glycerol, trimethylol ethane, trimethylol propane, bisphenol A, pentaerythritol, and dipentaeryrhritol, for example.

As concrete examples of the alkylene oxide to form an alkylene oxide moiety for linkage with the polyhydric alcohol, ethylene oxide, propylene oxide, isobutylene oxide, 1-butene oxide, 2-butene oxide, trimethyl ethylene oxide, tetramethylene oxide, tetramethyl ethylene oxide, butadiene monooxide, octylene oxide, styrene oxide, and 1,1-diphenyl ethylene oxide may be cited. For the sake of this invention, the alkylene oxide moiety may be a polyalkylene oxide obtained by polymerizing not less than two moles of one or more species of the alkylene oxide mentioned above. The alkylene oxide moieties to be bound to one molecule of polyhydric alcohol may be the same or different. The degree of polymerization of alkylene oxide does not need to be particularly restricted so long as the produced compound possesses a double bond equivalent of not less than 120 g/mol.

As concrete examples of the unsaturated carboxylic acid monomer to be bound to the alkylene oxide moiey, such ethylenic carboxylic acids as (meth)acrylic acid, maleic acid, fumaric. acid, maleic anhydride, itaconic acid, citraconic acid, and crotonic acid may be cited.

As particularly preferred cross-linking monomers possessed of an alkylene oxide moiety, it is commendable to use an acrylate of propylene oxide adduct of glycerin answering the following general formula (I) wherein R represents a hydrogen atom and a=b=c=1 is satisfied (made by Nippon Kayaku Co., Ltd. And sold under the trademark designation of "Kayarad GPO-303") and an acrylate of propylene oxide adduct of trimethylol propane answering the following general formula (II) wherein R' represents an ethyl group and a =3, b=0, and m=1 are satisfied (made by Nippon Kayaku Co., Ltd. And sold under the trademark designation of "Kayarad TPA-330"). In the general formula (II), "a" means a number of binding site of $CH_2O-[CH_2CH(CH_3)O]_m COCR=CH_2$ unit to a carbon adjoining R', "b" a number of binding site of $CH_2OCOC=CH_2$ unit to the carbon.

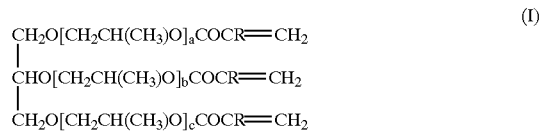

(I)

(wherein the plurality of R's may be the same or different and are each hydrogen atom or a methyl group and a, b, and c are each 0 or an integer and satisfy $a+b+c \geq 1$.)

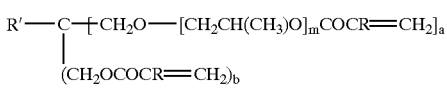

(wherein the plurality of R's may be the same or different and are each a hydrogen atom or a methyl group, R' represents a methyl group or an ethyl group, m, a, and b are each 0 or an integer, and satisfy m≧1 and a +b=3.)

ii) As a vinyl polymer or oligomer possessed of not less than two double bonds in the side chain or at the terminal, the polymer of an unsaturated carboxylic acid monomer possessed of a plurality of polymerizing double bonds in the molecular unit proves advantageous in respect that the produced porous cross-linked polymer material excels in the balance between mechanical strength and flexibility.

The vinyl polymer mentioned above is only required to be a vinyl polymer which is possessed of a plurality of polymerizing double bonds in the molecular unit. Liquid polybutadiene and (meth)acryl cross-linking polymers possessed of a plurality of polymerizing double bonds in the molecular unit may be cited as concrete examples, though not exclusively. (Meth)acryl cross-linking polymers possessed of a plurality of polymerizing double bonds in the molecular unit prove advantageous in respect that the produced porous cross-lined polymer material excels in the balance between mechanical strength and flexibility.

Such a (meth)acryl cross-linking polymer possessed of a plurality of polymerizing double bonds in the molecular unit as mentioned above can be obtained, for example, by a method which comprises first synthesizing a (meth)acryl polymer possessed of a functional group in the molecular unit by. copolymerizing an unsaturated monomer possessed of a functional group during the synthesis of a (meth) acryl polymer and subsequently causing this (meth)acryl polymer to react with a polymerizing monomer possessed of another functional group having reactivity with the functional group mentioned above.

As concrete examples of the combination of two functional groups having reactivity, carboxyl group and glycidyl group, carboxyl group and hydroxyl group, carboxyl group and amino group, carboxyl group and oxazoline group, carboxyl group and aziridine group, hydroxyl group and acid anhydride, and hydroxyl group and isocyanate group may be cited, though not exclusively. The polymerizing monomer possessed of such a combination of functional groups ought to be copolymerized with a (meth)acryl monomer and other polymerizing monomer does not need to be particularly discriminated. From the viewpoint of the ease and the convenience of the reaction, however, a method using the reaction of an unsaturated epoxy compound with a (meth)acryl polymer possessed of a carboxyl group and/or a method using the reaction of an unsaturated acid with a (meth) acryl polymer possessed of a glycidyl group prove preferable.

The weight average molecular weight of the vinyl polymer is preferably in the range of 2,000–500,000, more preferably in the range of 5,000–100,000, and still more preferably in the range of 10,000–40,000. If the weight average molecular weight of the vinyl polymer is less than 2,000, the shortage will be at a disadvantage in possibly causing the produced porous cross-linked polymer material to suffer from deficiency in flexibility. Conversely, if the weight average molecular weight exceeds 500,000, the excess will be at a disadvantage in possibly heightening the viscosity of the oil phase and rendering the preparation of an HIPE difficult.

The double bond equivalent of the vinyl. polymer, i.e. the molecular weight of one polymerizing double bond, is preferably in the range of 200–10,000 g/mol, more preferably in the range of 500–8,000 g/mol, and most preferably in the range of 500–5,000 g/mol. The double bond equivalent mentioned above is obtained as "the quotient of the division, molecular weight of vinyl polymer/number of polymerizing double bonds contained in the polymer molecule unit." If the double bond equivalent of the vinyl polymer mentioned above exceeds 10,000 g/mol, the excess will be at a disadvantage in possibly causing the produced porous cross-linked polymer material to suffer from deficiency in mechanical strength and flexiblity. Conversely, if the double bond equivalent of the vinyl polymer mentioned above is less than 200 g/mol, the shortage will be at a disadvantage in possibly heightening the viscosity of the oil phase and rendering the preparation of an HIPE difficult.

As a vinyl polymer for obtaining a porous cross-linked polymer material allowing easy preparation of an HIPE without heightening the viscosity of the oil phase and excelling in physical properties, a reacting liquid polymer which is described in the official gazette of Patent Application 2000-54,126 proves preferable. This official gazette discloses a method for polymerizing 60–99.9% of an acrylate of an aliphatic alcohol of 4–16 carbon atoms in the presence of mercaptan, preferably a method for producing a polymer possessed of a stellate structure obtained by using a polyvalent mercaptan as a mercaptan. According to this official gazette, the polymer of the stellate structure mentioned above produces a reacting polymer which has a weight average molecular weight of not less than 2,000, viscosity at 23° C. of not more than 100,000 cps, and a polymerizing unsaturated group concentration in the range of 500–10,000 g/mol and contains at least two polymerizing double bonds in the molecular unit. Since this reacting polymer manifests low viscosity, represses the possible rise of the viscosity of the oil phase when used as an oil phase component, facilitates manufacture of an HIPE, and abounds in plasticity as a cross-linking agent itself, it allows production of a cross-linking polymer material excelling in plasticity and strength.

Next, iii) the compound obtained by addition polymerizing to an active hydrogen-containing amino group contained in a polyalkylene imide an alkylene oxide in an amount exceeding the equivalent of the active hydrogen of the amino group and then binding (meth)acrylic acid by ester linkage to the resultant polyamine polyalkylene oxide compound will be described below. The polyalkylene polyamine to be used in the cross-linking agent is a compound containing an alkylene group and an amino group. The amino group includes primary amino group, secondary amino group, and tertiary amino group. Concrete examples of the polyalkylene polyamine include compounds having such ethylene groups as ethylene diamine, diethylene triamine, triethylene tetramine, and tetraethyl pentamine bound thereto with an amino group and polyalkylene imine. This invention prefers use of polyalkylene imine.

The polyalkylene imine can be obtained by polymerizing such alkylene imine as ethylene imine, propylene imine, 1,2-butylene imine, 2,3-butylene imine, or 1-dimethylethylene imine by the ordinary method. Besides the homopolymers of such alkylene imines, this invention finds polyalkylene imines obtained by mixing two or more species of alkylene imine, i.e. mixtures of ethylene imine and propylene imine, usable. Among them, polyethylene imine and polypropylene imine prove particularly preferable. Such a polyalkylene imine is commendable because it is cross-linked three-dimensionally in consequence of polymerization and is generally caused to contain a primary amino group and a secondary amino group, i.e. active hydrogen-containing amino groups, besides a tertiary amino group in the structure thereof.

Then, an alkylene oxide is added to the active hydrogen-containing amino group of the polyalkylene polyamine. As the alkylene oxide, the same compound as cited by way of example in i) above can be used. The number of addition polymers of alkylene oxide does not need to be particularly restricted so long as the produced cross-linking agent has a double bond equivalent weight of not less than 120 g/mol. Generally, the alkylene oxide, for example, is added to the active hydrogen-containing amino group of a polyalkylene polyamine in the presence of a reaction catalyst. As the reaction catalyst, any of the known catalysts can be used without any particular restriction. Generally, any one of (a) the anionic polymerization using a hydroxide of alkali metal such as sodium hydroxide, potassium hydroxide, or lithium hydroxide, a strong alkali such as alcoholate, or an alkylamine as a basic catalyst, (b) the cationic polymerization using a halogenide, mineral acid, or acetic acid of metal or half metal as a catalyst, and (c) the coordination polymerization using a combination of an metal alkoxide of aluminum, iron, or zinc, an alkaline earth compound, and Lewis acid. Subsequently, an unsaturated carboxylic acid monomer is bound to the alkylene oxide moiety by ester linkage. As the unsaturated carboxylic acid monomer to be used in this case, the same compound as explained in i) can be used.

iv) As a concrete example of the compound obtained by bonding not less than two molecules of an unsaturated carboxylic acid monomer by ester linkage to an oligo or a polyester possessed of a hydroxyl group or obtained by amide linkaging of an saturated amide monomer, the compounds which have an unsaturated carboxylic acid monomer described in i) esterified with a known polyester compound by the known method may be cited.

v) Then, as a concrete example of the compound obtained by bonding not less than two molecules of an unsaturated carboxylic acid monomer by urethane linkage to an oligo or a polyurethane, the compounds which have an unsaturated carboxylic acid monomer described in i) bonded to the known urethane by urethane linkage may be cited.

In this invention, only one species of the compound having a double bond equivalent of not less than 120 g/mol can be used singly or two or more species of such compound can be used in combination as the cross-linking agent.

The amount of the cross-linking monomer having a double bond equivalent of not less than 120 g/mol to be used is preferably in the range of 1–90 mass %, more preferably in the range of 10–70 mass %, and particularly preferably in the range of 20–60 mass %, based on the total mass of the monomer component which comprises the polymerizing monomer mentioned above and the cross-linking agent. If the amount of the cross-linking monomer to be used is less than 1 mass %, the shortage will be possibly at a disadvantage in causing the produced porous cross-linked polymer material to suffer from deficiency in strength and elastic recovery and insufficient amount of absorption per unit volume or unit weight and failing to secure absorption of water in a sufficient amount at a sufficient speed. Conversely, if the amount of the cross-linking monomer to be used exceeds 90 mass %, the excess will be possibly at a disadvantage in causing the porous cross-linked polymer material to become friable and deficient in the water absorption ratio.

Further, this invention may use one species or two or more species of the known other cross-linking agent in combination with the compound having a double bond equivalent of not less than 120 g/mol. The cross-linking agent that can be additionally used is only required to be possessed of at least two polymerizing unsaturated groups in the molecular unit. It does not need to be particularly discriminated but is only required, similarly to the polymerizing monomer mentioned above, to be capable of polymerizing in a disperse or water in oil type high internal phase emulsion and forming cells.

As concrete examples of the other cross-linking agent, aromatic monomers such as divinyl benzene, trivinyl benzene, divinyl toluene, divinyl xylene, divinyl naphthalene, divinyl alkyl benzenes, divinyl phenanthrene, divinyl biphenyl, divinyl diphenyl methane, divinyl benzyl, and divinyl phenyl ether; oxygen-containing monomers such as divinyl furane, sulfur-containing monomers such as divinyl sulfide and divinyl sulfone; aliphatic monomers such as butadiene, isoprene, and pentadiene; and ester compounds of polyhydric alcohols with acrylic acid or methacrylic acid such as ethylene glycol di (meth) acrylate, diethylene glycol di (meth) acrylate, 1,3-butane diol di(meth)acrylate, 1,4-butane diol di(meth)acrylate, 1,6-hexane diol di(meth) acrylate, trimethylol propane di(meth)acrylate, trimethylol propane tri(meth)acrylate, pentaerythritol di(meth)acrylate, dipentaerythritol di(meth)acrylate, dipentaerythritol tetra (meth)acrylate, N,N'-methylene bis(meth)acrylamide, triallyl isocyanurate, triallyl amine, tetraallyloxy ethane, hydroquinone, catechol, resorcinol, and sorbitol may be cited.

The amount of such "other cross-linking agent" to be incorporated is preferably in the range of 0–95 mass %, more preferably in the range of 0–85 mass %, and particularly preferably in the range of 0–65 mass %, based on the total mass of the cross-linking agent. If the amount of the other cross-linking agent to be incorporated exceeds 95 mass % of the total mass of the cross-linking agent, the excess will be at a disadvantage in preventing the compound of a double bond equivalent of not less than 120 g/mol from manifesting the effect thereof.

(c) Surfactant

The surfactant which is essential for the composition of the HIPE mentioned above does not need to be particularly discriminated but has only to be capable of emulsify a water phase in an oil phase forming the HIPE. It is not limited to the specific examples cited above but may be selected from the nonionic surf actants, cationic surfactants, amphoteric surfactants heretofore known to the art.

Among these surfactants, as concrete examples of the nonionic surf actant, nonyl phenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonylphenyl ether; polyoxyethylene sorbitan fatty acid esters such as polyoxyethylene sorbitan monolaurate, polyoxyethylene sorbitan monomyristylate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides may be cited. These nonionic surf actants having HLB values of not more than 10, more preferably in the range of 2–6, prove preferable. It is permissible to use two or more such nonionic surfactants in combination. The combined use possibly results in stabilizing the HIPE.

As concrete examples of the cationic surfactant, quaternary ammonium salts such as stearyl trimethyl ammonium chloride, ditallow dimethyl ammonium methyl sulfate, cetyl trimethyl ammonium chloride, distearyl dimethyl ammonium chloride, and alkylbenzyl dimethyl ammonium chloride; alkyl amine salts such as coconut amine acetate and stearyl amine acetate; alkyl betaines such as lauryl trimethyl ammonium chloride, lauryl betaine, stearyl betaine, and lauryl carboxymethyl hydroxyethyl imidazolinium betaine; and amine oxides such as lauryl dimethyl amine oxide may be cited. The use of the cationic surfactant can impart excellent antibacterial properties to the porous cross-linked polymer when the polymer is used for an absorbent material, for example.

The anionic surfactant of a kind possessing an anionic moiety and an oil-soluble moiety can be advantageously used. As concrete examples of anionic surfactant, such reactive anion emulsifiers possessed of a double bond as, for example, alkyl sulfates such as sodium dodecyl sulfate, potassium dodecyl sulfate, and ammonium alkyl sulfate; sodium dodecyl polyglycol ether sulfate; sodium sulforicinoate; alkyl sulfonates such as sulfonated paraffin salts; sodium dodecyl benzene sulfonate, alkyl sulfonates such as alkali metal sulfates of alkali phenol hydroxyethylene; higher alkyl naphthalene sulfonates; fatty acid salts such as naphthalene sulfonic acid formalin condensate, sodium laureate, triethanol amine oleate, and triethanol amine apiate; polyoxyalkyl ether sulfuric esters; sulfuric esters of polyoxyethylene carboxylic ester and polyoxyethylene phenyl ether sulfuric esters; succinic acid dialkyl ester sulfonates; and polyoxy ethylene alkyl aryl sulfates may be cited. An HIPE may be prepared by using an anionic surf actant in combination with a cationic surfactant.

The combined use of the nonionic surfactant and the cationic surfactant may possibly improve the HIPE in stability.

The content of the surfactant mentioned above is properly in the range of 1–30 mass parts, preferably 3–15 mass parts, based on 100 mass parts of the total mass of the monomer composition consisting of the polymerizing monomer and the cross-linked monomer. If the content of the surfactant is less than 1 mass part, the shortage will possibly deprive of. the HIPE of stability of dispersion and prevent the surfactant from manifesting the effect inherent therein sufficiently. Conversely, if the content of the surfactant exceeds 30 mass parts, the excess will possibly render the produced porous cross-linked polymer unduly friable and fail to bring a proportionate addition to the effect thereof and do any good economically.

(d) Water

The water essential for the composition of the HIPE mentioned above may be city water, purified water or deionized water. Alternatively, with a view to utilizing to advantage the waste water resulting from the production of the porous cross-linked polymer, this waste water may be adopted in its unmodified form or after undergoing a prescribed treatment.

The content of the water may be suitable selected, depending on the kind of use (such as, for example, an absorbent material, sound insulation material, or filter) for which the porous cross-linked polymer possessing continuous cells is intended. Since the hole ratio of the porous cross-linked polymer material is decided by varying the water phase/oil phase (W/O) ratio of the HIPE, the. amount of water to be used is automatically decided by selecting the W/O ratio calculated to produce a hole ratio which conforms to the use and the purpose of the produced material.

(e) Polymerization initiator

For the purpose of accomplishing the polymerization of an HIPE in a very short period of time as aimed at by this invention, it is advantageous to use a polymerization initiator. The polymerization initiator is only required to be suitable for use in the reversed phase emulsion polymerization. It is not discriminated between the water-soluble type and the oil-soluble type.

As concrete examples of the water-soluble polymerization initiator which is used effectively herein, azo compounds such as 2,2'-azobis(2-amidinopropane) dihydrochloride; persulfates such as ammonium persulfate, potassium persulfate, and sodium persulfate; peroxides such as potassium peracetate, sodium peracetate, sodium percarbonate, potassium peracetate may be cited. As concrete example of the oil-soluble polymerization initiator which is used effectively herein, peroxide such as, cumene hydroperoxide, t-butyl hydroperoxide, t-butylperoxide-2-ethylhexyanoate di-t-butyl peroxide, diisopropyl benzene hydroperoxide, p-methane hydroperoxide, 1,1,3,3-tetramethylbutyl hydroperoxide, 2,5-dimethylhexane-2,5-dihydroperoxide, benzoyl peroxide, and methylethyl ketone peroxide may be cited. These polymerization initiators may be used either singly or in the form of a combination of two or more members.

Combined use of two or more kinds of polymerization initiator having different 10 hour half period temperatures, i.e. the temperatures at which the concentrations of the relevant initiators are halved in 10 hours proves advantageous. As a matter of course, it is permissible to use in combination the water-soluble polymerization initiator and the oil-soluble polymerization initiator.

The content of the polymerization initiator mentioned above is properly in the range of 0.05.-25 mass parts, preferably 1.0–10 mass parts, based on 100 mass parts of the total mass of the monomer composition consisting of a polymerizing monomer and a cross-linking monomer, though it is variable with the combination of the polymer composition and the polymerization initiator. If the content of the polymerization initiator is less than 0.05 mass part, the shortage will be at a disadvantage in increasing the amount of the unaltered monomer component and consequently increasing the residual monomer content in the produced porous cross-linked polymer. Conversely, if the content of the polymerization initiator exceeds 25 mass parts, the excess will be at a disadvantage in rendering the polymerization difficult to control and degrading the mechanical property of the produced porous cross-linked polymer.

Alternatively, a redox polymerization initiator formed by combining the polymerization initiator mentioned above with a reducing agent may be used. In this case, the polymerization initiator to be used herein does not need to be discriminated between the water-soluble type and the oil-soluble type. It is permissible to use a water-soluble redox polymerization initiator and an oil-soluble redox polymerization initiator in combination.

In the reducing agents, as concrete examples of the water-soluble reducing agents., sodium hydrogen sulfite, potassium hydrogen sulfite, sodium thiosulfate, potassium thiosulfate, L-ascorbic acid, ferrous salts, formaldehyde sodium sulfoxylate, glucose, dextrose, triethanol amine, and diathanol amine may be cited. As concrete examples of the oil-soluble reducing agent, dimethyl aniline, tin octylate, and cobalt naphthenate may be cited. These redox polymerization initiator type reducing agents may be used either singly or in the form of a mixture of two or more members.

The ratio of the reducing agent contained in the redox polymerization initiator mentioned above (mass ratio), i.e. the polymerization initiator (oxidizing agent)/reducing agent, is in the approximate range of 1/0.01–1/10, preferably 1/0.2–1/5.

The polymerization initiator (inclusive of the redox polymerization initiator) is only required to be present at least during the course of the polymerization of an HIPE. It may be added to the oil phase and/or the water phase ① prior to the formation of an HIPE, ② simultaneously with the formation of an HIPE, or ③ after the formation of an HIPE. In the case of the redox polymerization initiator, the polymerization initiator (oxidizing agent) and the reducing agent may be added at different times.

(f) Salt

The salt as an arbitrary component for the composition of the HIPE mentioned above may be used when it is necessary for improving the stability of the HIPE.

As concrete examples of the salt of this nature, halogenides, sulfates, nitrates, and other similar water-soluble salts of alkali metals and alkaline earth metals such as calcium chloride, sodium sulfate, sodium chloride, and magnesium sulfate may be cited. These salts may be used either singly or in the form of a combination of two or more members. Such a salt is preferred to be added in the water phase. Among other salts mentioned above, polyvalent metal salts prove particularly advantageous from the viewpoint of the stability of the HIPE during the course of polymerization.

The content of the salt mentioned above is proper in the range of 0.1–20 mass parts, preferably 0.5–10 mass parts, based on 100 mass parts. If the content of the salt exceeds 20 mass parts, the excess will be at a disadvantage in suffering the waste water squeezed out of the HIPE to contain the water in an unduly large amount, boosting the cost for the disposal of the waste water, failing to bring a proportional addition to the effect, and not doing any good economically. If the content is less than 0.1 mass part, the shortage will possibly prevent the effect of the addition of the salt from being fully manifested.

(g) Other Additive

Varying other additive which are capable of improving the conditions of production, the property of HIPE, and the performance of the porous cross-linked polymer by imparting the performance and the function of their own, they may be suitably used herein. For example, a base and/or a buffer may be added for the purpose of adjusting the pH value. The content of the other additive may be selected within such a range that the additive used may fully manifest the performance, function, and further the economy commensurate with the purpose of addition. As such additives, activated carbon, inorganic powder, organic powder, metallic powder, deodorant, antibacterial agent, antifungi agent, perfume and other highly polymerized compounds may be cited.

(2) Method for Preparation of HIPE

The method for production of the HIPE which can be used in this invention does not need to be particularly discriminated. Any of the methods for production of HIPE heretofore known to the art may be suitably used. A typical method for the production of interest will be specifically described below.

First, a polymerizing monomer, a cross-linking monomer, and a surfactant as essential components and further an oil-soluble polymerization initiator (inclusive of an oil-soluble redox polymerization initiator) and other additive as optional components for the formation of an oil phase prepared in respectively specified amounts mentioned above are stirred at a prescribed temperature to produce a homogeneous oil phase.

Meanwhile, water as an essential component and further a water-soluble polymerization initiator (inclusive of a water-soluble redox polymerization initiator), salts, and other additive as optional components for the formation of a water phase prepared in respectively specified amounts are stirred and heated to a prescribed temperature in the range of 30–95° C. to produce a homogeneous water phase.

Then, the oil phase which is the mixture of the monomer component, surfactant, etc. and the water phase which is the mixture of water, water-soluble salt, etc., both prepared as described above are joined, mixed and stirred efficiently for exertion of proper shearing force and induction of emulsification at the temperature for the formation of an HIPE (emulsifying temperature) which will be described specifically hereinbelow to accomplish stable preparation of an HIPE. As a means for stirring and mixing the water phase and the oil phase particularly for the table preparation of the HIPE, the method which comprises keeping the oil phase stirred and continuously adding the water phase to the stirred oil phase over a period of several minutes to some tens of minutes. Alternatively, the HIPE aimed at may be produced by stirring and mixing part of the water phase component and the oil phase component thereby forming an HIPE resembling yogurt and continuing the stirring and mixing operation while adding the remaining portion of the water phase component to the yogurt-like HIPE.

(3) Water Phase/oil Phase (W/O) Ratio

The water phase/oil phase (W/O) ratio (mass ratio) of the HIPE which is obtained as described above does not need to be particularly limited but may be properly selected to suit the purpose for which the porous cross-linked polymer material possessed of open cells is used (such as, for example, water absorbent, oil absorbent, sound insulating material, and filter). It is only required to be not less than 3/1 as specified above and is preferred to fall in the range of 10/1 –250/1, particularly 10/1–100/1. If the W/O ratio is less than 3/1, the shortage will be possibly at a disadvantage in preventing the porous cross-linked polymer material from manifesting a fully satisfactory ability to absorb water and energy, lowering the degree of opening, and causing the surface of the produced porous cross-linked polymer material to suffer from unduly low degree of opening and fail to exhibit a fully satisfactory permeability to liquid. The hole ratio of the porous cross-linked polymer material is decided by varying the W/O ratio. Thus, the W/O ratio is preferred to be selected so as to impart to the produced porous cross-linked polymer material a hole ratio conforming to the use and the purpose. When the product is used as a varying absorbent material such as disposable diaper or sanitary article, for example, the W/O ratio is preferred to fall in the approximate range of 10/1–100/1. Incidentally, the HIPE which is obtained by stirring and mixing the water phase and the oil phase is generally a white highly viscous emulsion.

(4) Apparatus for Production of HIPE

The apparatus for the production of the HIPE mentioned above does not need to be particularly discriminated. Any of the apparatuses for the production of the porous cross-linked polymer material which have been heretofore known to the art may be used. For example, the stirring device (emulsifier) to be used for mixing and stirring the water phase and the oil phase may be selected from among the stirring devices and the kneading devices which have been heretofore known to the art. As concrete examples of the stirring device, stirring devices using vanes of the propeller type, the paddle type, and the turbine type, homomixers, line mixers, and pin mills may be cited.

(5) Forming Temperature of HIPE

The forming temperature of an HIPE (hereinafter referred to as "emulsifying temperature") is the temperature at which the water phase and the oil phase of the temperature mentioned above are mixed. It is generally in the range of 60–150° C. From the view point of the stability of the HIPE, it is preferably in the range of 75–110° C., more preferably in the range of 85–110° C., particularly preferably in the range of 80–95° C., and most preferably in the range of 80–90° C. If the forming temperature of the HIPE is less than 60° C., the shortage will be possibly at a disadvantage in requiring application of heat for a long time, depending on the curing temperature. Conversely, if the forming temperature of the HIPE exceeds 150° C., the excess will be possibly at a disadvantage in causing the formed HIPE to be deficient in stability. It is commendable to form a necessary HIPE by preparatorily adjusting the temperature of the oil phase and/or the water phase to a prescribed emulsifying temperature and stirring and mixing them till emulsification. Since the amount of the water phase is large during the preparation of the HIPE, it may well be considered preferable to have the temperature of at least the water phase adjusted in advance to the prescribed emulsifying temperature. When a polymerization initiator (inclusive of a redox polymerization initiator) is incorporated in advance of the preparation of the HIPE, the emulsifying temperature of the HIPE is preferred to be fixed at a level capable of avoiding substantially inducing thermal decomposition of the polymerization initiator (oxidizing agent) and consequently initiating the polymerization of the HIPE. Thus, the emulsifying temperature is preferred to be lower than the temperature at which the half life of the polymerization initiator (oxidizing agent) is 10 hours (10-hour half life temperature).

[II] Production of Porous Cross-linked Polymer Material (1) Addition of Polymerization Initiator (a) Time for addition of Polymerization Initiator This invention contemplates ① adding a polymerization initiator to the water phase and/or the oil phase and mixing them prior to the formation of an HIPE, ② simultaneously adding the polymerization initiator with the formation of the HIPE, or ③ making this addition subsequently to the formation of the HIPE. Even in the case of the addition of ③, a redox polymerization initiator may be used similarly in the case of ① described above regarding the method for forming the HIPE.

(b) Method for Addition of Polymerization Initiator

It is convenient to add preparatorily the polymerization initiator to the oil phase when the polymerization initiator or the reducing agent is an oil-soluble type or to the water phase when it is in a water-soluble type. Alternatively, the oil-soluble polymerization initiator (oxidizing agent) or the reducing agent may be added in an emulsified form, for example, to the water phase.

(c) Form of use of Polymerization Initiator

The polymerization initiator may be used in an undiluted form, in the form of a solution in water or an organic solvent, or in the form of a dispersion. When the addition is made either simultaneously with or subsequently to the formation of the HIPE, it is important that the added polymerization initiator be quickly and homogeneously mixed with the HIPE for the purpose of avoiding the otherwise possible heterogeneous polymerization of the monomer component. Further, the HIPE which has been mixed with the polymerization initiator is quickly introduced into a polymerization vessel or a continuous polymerizing device as means for polymerization. It is commendable from this point of view to insert a path for the introduction of a polymerization initiator such as a reducing agent or an oxidizing agent in the path extending from the emulsifying device for preparing the HIPE through the polymerization vessel or the continuous polymerizing device, adding the polymerization initiator via the path to the HIPE, and mix them by means of a line mixer.

If the HIPE which contains the polymerization initiator has a small difference between the emulsifying temperature and the polymerizing temperature thereof, the closeness of the emulsifying temperature to the polymerizing temperature will possibly set the polymerizing monomer or the cross-linking monomer polymerizing during the course of the emulsification and suffer the resultant polymer to impair the stability of the produced HIPE. Thus, the method of adding the reducing agent or the oxidizing agent or other polymerization initiator to the HIPE immediately prior to the polymerization, i.e. the method of ② or ③ mentioned above, proves advantageous.

The amount of the polymerization initiator to be used herein equals that in the method described above under the title of the method for preparation of HIPE.

(2) Polymerization of HIPE (a) Method for Polymerization

The method for polymerizing the HIPE mentioned above does not need to be particularly discriminated. Any of the known methods for polymerization of an HIPE may be properly adopted to suit the occasion. Generally, this polymerization is carried out by the method of stationary polymerization under conditions incapable of breaking the structure of water drops highly dispersed in the oil of the HIPE. In this case, the HIPE may be polymerized batchwise or polymerized continuously while continuously feeding the HIPE in the form of a layer.

For the purpose of utilizing to advantage the effect of short-time polymerization at an elevated temperature which characterizes this invention, the method for polymerization is preferred to be the continuous polymerization which can elevate the temperature of the HIPE more easily than the batch polymerization. It is commendable, for example, to adopt a method for continuous polymerization which comprises continuously forming the HIPE in the form of a layer on a belt in motion and polymerizing the layer of HIPE on the belt. Specifically, as a technique for continuous polymerization of a porous cross-linked polymer in the form of a sheet, a method which comprises continuously supplying an HIPE onto a belt in motion which is so constructed as to heat the surface of a belt of a bent conveyor by a heating device and polymerizing the HIPE meanwhile shaping the HIPE in the form of a smooth sheet on the belt may be cited. When the surface of the conveyor which contacts the emulsion is flat and smooth, the polymer in the form of a continuous sheet can be obtained in a necessary thickness by supplying the HIPE in the necessary thickness onto the belt. Since this invention is capable of preparing the HIPE at an elevated temperature, the method of continuous polymerization which continuously polymerizes the HIPE proves advantageous because it enjoys high efficiency of production and utilizes most efficiently the effect of curtailing the polymerization time. Further, the procedure of polymerizing the HIPE meanwhile conveying the HIPE horizontally in the form of a sheet as described above constitutes itself a preferred mode even in consideration of the fact that the oil phase and the water phase of the HIPE are possessed of a comparatively friable behavior of easily deflecting and separating in the vertical direction. Even in this case, the HIPE can be polymerized in the form of a block or a sheet and then worked in a necessary shape by cutting the block into sheets each measuring 5 mm in thickness.

(b) Polymerizing Temperature

The polymerizing temperature of the HIPE of this invention does not need to be particularly discriminated. It can be polymerized by the known temperature. It is generally in the range of 60–150° C. From the viewpoint of the stability of the HIPE and the speed of polymerization, it is preferably in the range of 75–130° C., and particularly preferably in the range of 85–110° C. If the polymerizing temperature is lower than 60° C., the shortage will be possibly at a disadvantage in necessitating an unduly long time for polymerization and rendering commercial production unfavorable. Conversely, if the polymerizing temperature exceeds 150° C., the excess will be possibly at a disadvantage in causing the produced porous cross-linked polymer material to suffer from ununiform pore diameters. Optionally, the polymerizing temperature may be varied in two stages or in more stages during the process of polymerization. This invention does not exclude this manner of effecting the polymerization.

(c) Polymerizing Time

The polymerizing time of an HIPE in the present invention does not need to be particularly discriminated. Generally, it's in the range of one minute-20 hours. It is preferably within one hour, more preferably within 30 minutes, and particularly preferably in the range of one-20 minutes. For the purpose of completing the polymerization of the HIPE within one hour, it is commendable to fix the amount of the polymerization initiator to be completely decomposed within the polymerizing time in the range of 0.05–5.0 mol %, preferably in the range of 1–3 mol %, based on the amount of the monomer component. When the number of radicals to be generated by the decomposition of the polymerization initiator is n>2, the value of the amount of the polymerization initiator in the range multiplied by n>2. This value represents the amount of the polymerization initiator to be completely decomposed within the polymerizing time. The kind and the amount of the polymerization initiator and the polymerizing temperature to be used are set so that the amount in question falls in the range just mentioned. When these factors are to be set, they may be properly selected in consideration of the half-time temperature of the relevant polymerization initiator, for example. If the polymerizing time is less than one minute, the shortage will be possibly at a disadvantage in preventing the porous cross-linked polymer material from acquiring satisfactory strength. Naturally, this invention does not need to preclude adoption of a longer polymerizing time than the range mentioned above.

After the polymerization, the formed polymer is cooled, gradually optionally, to the prescribed temperature which does not need to be particularly limited. The porous cross-linked polymer material obtained by the polymerization, when necessary, may be transferred to the process of such after treatment as the dehydration or the compression which will be described specifically herein below.

(d) Apparatus for Polymerization

The apparatus for polymerization which can be used in this invention does not need to be particularly discriminated. It may be properly selected to suit the relevant method of polymerization from the known chemical devices and put to use, optionally in a modified form. In the batch polymerization, for example, a polymerization vessel having a shape fit for the purpose of use. In the case of the continuous polymerization, a belt conveyor type continuous polymerizing device furnished with compressing rollers may be used. The apparatus of interest may additionally incorporate therein temperature elevating means or controlling mens which fits the relevant method of polymerization such as, for example, temperature elevating means capable of quickly elevating the temperature to the curing temperature by the use of the active thermal energy ray such as microwaves or infrared rays which can utilize the radiation energy or the thermal medium such as hot water or hot air. The apparatus for polymerization that can be used in this invention does not need to be limited thereto. Further in the case of batch polymerization, the upper and lower surfaces of the mass of the HIPE introduced into the polymerization vessel are preferred to be prevented from contacting the ambient air, particularly the oxygen contained in the air from the start of polymerization through the completion thereof. These surface parts are necessary for the purpose of infallibly securing the structure of open cells. Thus, in the case of the belt conveyor type continuous polymerization, a PET film is spread on the belt conveyor engaged in supplying the HIPE and, after the supply of the HIPE, a sealing material such as a PET film is mounted on the HIPE to seal the HIPE from the ambient air. The material for the polymerization apparatus does not need to be particularly discriminated. Metals such as aluminum, iron, and stainless steel, synthetic resins such as polyethylene, polypropylene, fluorine resin, polyvinyl chloride, and unsaturated polyester resin, and fiber-reinforced resins such as the synthetic resins mentioned above which are reinforced with such fibers as glass fibers or carbon fibers may be used.

(3) Step of Aftertreatment (Conversion into Finished Product) After Formation of Porous Cross-linked Polymer Material (a) Dehydration The porous cross-linked polymer material formed in consequence of the completion of polymerization is normally dehydrated by compression, aspiration under reduced pressure, or the combination thereof. By this dehydration, generally 50–98% of the water used is removed and the remainder thereof is left adhering to the porous cross-linked polymer material.

The ratio of dehydration is properly set to suit the purpose for which the produced porous cross-linked polymer material is used. Generally, the water content in the porous cross-linked polymer material in a perfectly dried state is set at a level in the range of 1–10 g, preferably 1–5 g, per g of the polymer material.

(b) Compression

The porous cross-linked polymer of this invention can be obtained in a form compressed to one of several divisions of the original thickness. The compressed sheet has a smaller inner volume than the original porous cross-linked polymer and permits a decrease in the cost of transportation or storage. The porous cross-linked polymer in the compressed state is characterized by being disposed to absorb water when exposed to a large volume of water and resume the original thickness and exhibiting the ability to absorb water at a higher speed than the original polymer.

From the viewpoint of saving the space for transportation or storage and facilitating the handling, it is effective to compress the polymer to not more than ½ of the original thickness. Preferably, the compression is made to not more than ¼ of the original thickness.

(c) Cleaning

For the purpose of improving the surface condition of the porous cross-linked polymer, the porous cross-linked polymer may be washed with pure water, an aqueous solution containing an arbitrary additive, or a solvent.

(d) Drying

The porous cross-linked polymer obtained by the preceding steps, when necessary, may be dried by heating as with hot air or microwaves or may be moistened for adjustment of the water content.

(e) Cutting

The porous cross-linked polymer obtained by the preceding steps, when necessary, may be cut in expected shape and size and fabricated into a finished product fitting the purpose of use.

(f) Impregnation

The polymer may be endowed with functionality by being impregnated with a detergent or an aromatic agent.

EXAMPLES

Now, this invention will be described more specifically below with reference to working examples and comparative examples. The scope of this invention is not limited by these examples. The properties of the porous cross-linked polymer material which are reported in these working examples were determined and rated as follows.

Ratio of Free swelling

A sample cut in the cube of 1 cm was dried and weighed and immersed in an ample amount of purified water. The sample swelled by absorbing the purified water was left standing and draining for 30 seconds on a glass filter 120 mm in diameter and 5 mm in thickness (made by Duran Corp. and sold under the product code of "#0"). The sample now wet with the absorbed water was weighed. The ratio of free swelling (g/g) of the porous cross-linked polymer material was calculated in accordance with the formula 2 shown below using the weight found as above.

Ratio of free swelling (%)=[(Mass of sample after absorbing water−Weight of sample before absorbing water)/(Mass of sample before absorbing water)]×100    Formula 1:

Flexibility

A sample swelled in physiological saline solution at 37° C. is cut into test pieces measuring 7×0.8×0.8 cm. A test piece is bent round a cylindrical mandrel 0.8 cm in diameter at a uniform speed for five seconds. When the test piece is neither torn nor broken throughout the period of this test, the porous cross-linked polymer material affording this sample is rated as possessing flexibility.

Resistance to Compression Strain

A sample was cut to obtain a disc 5 mm in thickness and 2.87 cm in diameter. The disc was immersed in a physiological saline solution at 32° C. The disc in the immersed state was tested for thickness under no load by the use of a dead-load thickness meter (made by Ono Sokkiseizo K.K. and sold under the trademark designation of "Digital Linear Gauge Model EG-225"). After the elapse of 15 minutes then, the sample was held under a load of 5.1 kPa. When the mass of the sample reached the state of equilibrium, the thickness of the sample under the load was measured. The resistance to compression strain (RTCD) (%) was calculated in accordance with the formula 2 shown below.

R.T.C.D. (%)=[(Thickness under no load−Thickness under load)/(Thickness under no load)]×100    Formula 2:

Synthesis Example 1 Synthesis of (Meth)acryl Type Cross-linked Polymer (1)

A reaction vessel provided with a thermometer, a condenser tube, a gas inlet tube, and a stirrer was charged with 93 mass parts of methyl methacrylate and 7 mass parts of methacrylic acid and displaced with nitrogen gas. Then, the resultant mixture was stirred and meanwhile heated to 80° C. The stirred and heated mixture and 1 mass part of azobisisobutyronitile as a polymerization initiator and 4 mass parts of n-dodecyl mercaptan as a chain transfer agent added thereto were together copolymerized for four hours. Then, the polymerization was stopped by blowing air into the system and, at the same time, adding 0.01 mass part of hydroquinone thereto.

Then, the contents of the reaction vessel, after adding 5.8 mass parts of glycidyl methacrylate and 0.1 mass part of triethyl amine as an esterifying catalyst, was heated to 100° C. and left reacting under an atmosphere of air for five hours to synthesize a mixture (1) of a (meth)acryl cross-linked polymer having a solid component concentration of 51%, a weight average molecular weight of the solid component of 17,000 determined by gel permeation chromatography and reduced to polystyrene and a polymerizing monomer (hereinafter referred to as "cross-linking methacryl syrup"). The polymer component and the monomer component contained in the produced cross-linking methacryl syrup were separated. by reprecipitation. The double bond equivalent contained in the polymer was found to be 2,300 g/mol.

Synthesis Example 2 Synthesis of (Meth)acryl Cross-linking Polymer (2)

The same reaction vessel as used in Synthesis Example 1 was charged with 94.1 mass parts of methyl methacrylate and 5.9 mass parts of glycidyl methacrylate and displaced with nitrogen gas. Then the resultant mixture was stirred and meanwhile heated to 80° C. The stirred and heated mixture and 1 mass part of azobisisobutyronitrile and 4 mass parts of n-dodecyl mercaptan added thereto were together copolymerized for four hours. The polymerization was stopped by blowing air into the system and, at the same time, adding 0.01 mass part of hydroquinone thereto. Then, the contents of the reaction vessel, after adding 3.5 mass parts of methacrylic acid and 0.1 mass part of triethyl amine, was heated to 100° C. and left reacting under an atmosphere of air for five hours to synthesize a cross-linking methacryl syrup (2). The physical constants of the produced cross-linking methacryl syrup (2) are 50% of solid component concentration, 16000 of weight average molecular weight, 35 poises of viscosity, and 3500 g/mol of double bond equivalent weight.

Synthesis Example 3 Synthesis of (Meth)acrylic Type Cross-linking Polymer (2)

A flask having an inner volume of 2000 ml and provided with a thermometer, a condenser tube, a gas inlet tube, and a stirrer was charged with 200 mass parts of ethyl acetate. The contents of the flask was heated to the boiling point, with the gas entrapped therein displaced with nitrogen gas. To the heated contents of the flask, 20 mass % of a polymerizing unsaturated monomer (A) composed of 460 mass parts of butyl acrylate, 460 mass parts of 2-ethylhexyl acrylate, and 72 mass parts of acrylic acid was introduced. Subsequently, 20 mass % of a polymerization initiator solution composed of 95.2 mass parts of pentaerythritol tetrakisthio-glycolate, 0.25 mass part of 2,2'-azobisisobutyronitrile, and 100 mass parts of ethyl acetate was introduced to initiate polymerization. After 30 minutes following the start of polymerization, the dropwise addition of the polymerizing monomer mixture and the initializing agent solution was started and completed in 2.5 hours. A booster composed of 1.0 mass part of 2,2'-azobis-isobutylonitrile and 10 mass parts of, ethyl acetate was divided into two equal portions and these portions were introduced 30 minutes and 60 minutes after completion of the dropwise addition and the resultant contents were left aging for 90 minutes. The liquid polymer solution which contained a stellate polymer consequently obtained had an involatile substance concentration of 77.2 mass %, a polymerization ratio of 98.5%, a number average molecular weight of 3,800 (Mn), a weight average molecular weight of 5,700 (Mw), a molecular weight distribution (Mw/Mn) of 1.50. Thus, the polymer had a narrow distribution of molecular weight.

Then, the heating was continued to remove the solvent and expel the volatile component. After 90 minutes following the start of the removal of the solvent, the inner temperature of the flask reached 131° C. and the non-volatile component concentration reached 99.8 mass %. With the inner temperature of the flask cooled to 90° C., the contents of the flask and 0.373 mass part of topanol as a polymerization inhibitor, 142 mass parts of glycidyl methacrylate, and 2.86 mass parts of benzyl tributyl ammonium chloride as a reaction catalyst added thereto were left reacting together for 8 hours to obtain a reacting liquid polymer (1) having introduced a methacrylic ester group, i.e. a polymerizing unsaturated group, through the medium of the carboxyl group the the liquid polymer and the epoxy group of the glycidyl methacrylate.

The reacting liquid polymer (1) had a number average molecular weight of 4,200 (Mn); a weight average molecular weight of 7,000 (Mw), a molecular weight distribution (Mw/Mn) of 1.65, a double bond equivalent of 1,530 g/mol, and viscosity at 23° C. of 17,500 cpm.

EXAMPLE 1

A water phase to be used in a continuous type emulsion process for the formation of a high water content of water in oil type emulsion was prepared by dissolving 36.3 kg of calcium chloride anhydride and 568 g of potassium persulfate in 378 liters of purified water. An oil phase was obtained by adding 960 g of decaglyceryl trioleate to a mixture of 500 g of styrene, 3800 g of 2-ethylhexyl alcrylate, 2140 g of 55% divinyl benzene, 880 g of 1,6-hexane diol diacrylate, and 680 g of the cross-linking methacryl syrum (1). The water phase was supplied at a temperature of 80° C. at a flow volume of 56.5 cm³/s and the oil phase was supplied at a temperature of 22° C. at a flow volume of 1.13 g/s respectively to a dynamic mixing device, completely mixed therein with a pin impeller rotating at 1800 rpm, with part thereof recycled at a flow volume of 57.6 cm³/s at 79° C. to obtain an HIPE. The resultant HIPE was cast between sheet materials (PET film) 203, 205 mounted on an apparatus illustrated in FIG. 1, controlled to a thickness of 5 mm, moved on an endless belt type conveyor 201, and passed through a polymerization furnace 215 set at an inner temperature of 80° C. at a moving speed of 15 cm/min and polymerized therein for 60 minutes to obtain a porous cross-linked polymer material as a cured substance. The porous cross-linked polymer material 102 thus obtained was dehydrated and dried to obtain a porous cross-linked polymer material.

The produced porous cross-linked polymer material had a free swelling ratio of 47 g/g and a low RTCD of 9%, showed only small strain under pressure, exhibited satisfactory behavior under pressure, possessed flexibility, and excelled in performance.

EXAMPLE 2

A porous cross-linked polymer material was obtained by following the procedure of Example 1 while using 680 g of Kayarad GPO-303 (having a double bond equivalent of 143 g/mol, made by Nippon Kayaku Co., Ltd.) as a cross-linking agent possessed of an alkylene oxide moiety in the place of 680 g of the cross-linking methacryl syrup (1). The produced porous cross-linked polymer material had a free swelling ratio of 47 g/g and a low RTCD of 6%, showed only small strain under pressure, exhibited satisfactory behavior under pressure, possessed of flexibility, and excelled in performance.

EXAMPLE 3

An HIPE was obtained by following the procedure of Example 1 while using a water phase of 85° C. in the place of the water phase of 80° C. The produced HIPE was cast between the PET films mounted on an apparatus of FIG. 1, controlled to a thickness of 5 mm, then moved on a ribbon of plate, passed through a polymerization furnace set at an inner temperature of 95° C at a moving speed of 1.25 m/min, and polymerized therein for eight minutes to obtain a cured polymer. The cured polymer was dehydrated and dried to obtain a porous cross-linked polymer material. The porous cross-linked polymer material had a free swelling ratio of 47 g/g and a low RTCD of 8%, showed only small strain under pressure, manifested satisfactory performance under pressure, possessed of flexibility, and excelled in performance.

EXAMPLE 4

An HIPE was obtained by following the procedure of Example 1 while using 680 g of a cross-linking methacryl syrup (2) in the place of 680 g of the cross-linking methacryl syrup (1). The HIPE was cast between PET films, controlled to a thickness of 5 mm, moved on a ribbon of plate, and passed through a polymerization furnace set at an inner temperature of 80° C. at a moving speed of 30 cm/min, and polymerized therein for 30 minutes to obtain a cured polymer. The cured polymer thus obtained was dehydrated and dried to obtain a porous cross-linked polymer material. The porous cross-linked polymer material had a free swelling ratio of 47 g/g and a low RTCD of 8%, showed only small strain under pressure, exhibited satisfactory performance under pressure, possessed of flexibility, and excelled in performance.

EXAMPLE 5

A porous cross-linked polymer material was obtained by following the procedure of Example 1 while using 680 g of Kayarad TPA-330 (having a double bond equivalent of 157 g/mol, made by Nippon Kayaku Co., Ltd.) in the place of 680 g of the cross-linking methacryl syrup (1). The produced porous cross-linking polymer material had a free swelling ratio of 47 g/g and a low RTCD of 7%, showed only small strain under pressure, exhibited satisfactory performance under pressure, possessed of flexibility, and excelled in performance.

EXAMPLE 6

An HIPE was obtained by following the procedure of Example 1. In a plastic vessel having an inner volume of 600 cc, 250 g of the HIPE was placed, sealed with a stopper, and polymerized by being immersed in a water bath set at 65° C. for 16 hours to obtain a cured polymer. The cured polymer was sliced into pieces 5 mm in thickness, dehydrated, and dried to obtain a porous cross-linked polymer material. The porous cross-linked polymer material thus obtained had a free swelling ratio of 47 g/g and a low RTCD of 9%, showed only small strain under pressure, exhibited satisfactory performance under pressure, possessed of flexibility, and excelled in performance.

EXAMPLE 7

An HIPE was obtained by following the procedure of Example 2. In a plastic vessel having an inner volume of 600 cc, 250 g of the HIPE was placed, sealed with a stopper, and polymerized by being immersed in a water bath set at 80° C. for 60 minutes to obtain a cured polymer. The cured polymer was sliced into pieces 5 mm in thickness, dehydrated, and dried to obtain a porous cross-linked polymer material. The porous cross-linked polymer material thus obtained had a free swelling ratio of 47 g/g and a low RTCD of 6%, showed only small strain under pressure, exhibited satisfactory performance under pressure, possessed of flexibility, and excelled in performance.

Comparative Example 1

A porous cross-linked polymer material was obtained by following the procedure of Example 1 while using an oil phase obtained by adding 960 g of decaglyceryl trioleate to a mixture of 500 g of styrene, 4400 g of 2-ethylhexyl acrylate, 2410 g of 55% divinyl benzene, and 960 g of 1,6-hexane diol diacrylate. The produced porous cross-linked polymer material had a free swelling ratio of 47 g/g and a high RTCD of 12%, showed large strain under pressure, and exhibited poor performance under pressure.

Comparative Example 2

An HIPE was obtained by following the procedure of Example 1 while using an oil phase obtained by adding 960 g of decaglyceryl trioleate to a mixture of 500 g of styrene, 4400 g of 2-ethylhexyl acrylate, 2140 g of 55% divinyl benzene, and 960 g of 1,6-hexane diol diacrylate. In a plastic vessel having an inner volume of 600 cc, 250 g of the HIPE was placed, sealed with a stopper, and then polymerized by being immersed in water bath set at 65° C. for 16 hours to obtain a cured polymer. The cured polymer was sliced into pieces 5 mm in thickness and then dehydrated and dried to obtain a porous cross-linked polymer material. The porous cross-linked polymer had a free swelling ratio of 47 g/g but possessed no flexibility and exhibited poor performance.

Comparative Example 3

An HIPE was obtained by following the procedure of Example 1 while using an oil phase obtained by adding 960 g of decaglyceryl trioleate to a mixture of 500 g of styrene, 4400 g of 2-ethylhexyl acrylate, 2140 g of 55% divinyl benzene, and 960 g of 1,6-hexane diol diacrylate. In a plastic vessel having an inner volume of 600 cc, 250 g of the HIPE was placed, sealed with a stopper, and then polymerized by being immersed in water bath set at 80° C. for 60 minutes to obtain a cured polymer. The cured polymer was sliced into pieces 5 mm in thickness and then dehydrated and dried to obtain a porous cross-linked polymer material. The porous cross-linked polymer had a free swelling ratio of 47 g/g and a high RTCD of 12% and manifested large strain under pressure and exhibited poor performance under pressure.

EXAMPLE 8

A porous cross-linked polymer material was obtained by repeating the procedure of Example 6 while forming an oil phase by adding 448 g of diglycerine monooleate and 72 g of ditallow dimethyl ammonium chloride to a mixture of 3288 g of 2-ethylhexyl acrylate, 2640 g of 42% divinyl benzene, 960 g of 1,6-hexane diol diacrylate, and 1112 g of the reacting liquid polymer (1) obtained in Synthesis Example 3, supplying a water phase at a temperature of 65° C. into a dynamic mixing device, mixing the oil phase and the water phase, and emulsifying them.

When the porous cross-linked polymer material was rated in the same manner as in Example 1, it was found to have a free swelling ratio of 47 g/g and a low RTCD of 7%, show small strain under pressure, manifest satisfactory performance under pressure, possess of flexibility, and excel in performance.

EXAMPLE 9

A porous cross-linked polymer material was obtained by repeating the procedure of Example 1 while forming an oil phase by adding 448 g of diglycerine monooleate and 72 g of ditallow dimethyl ammonium chloride to a mixture of 3856 g of 2-ethylhexyl acrylate, 2640 g of 42% divinyl benzene, 960 g of 1,6-hexane diol diacrylate, and 544 g of the reacting liquid polymer (1) obtained in Synthesis Example 3.

When the porous cross-linked polymer material was rated in the same manner as in Example 1, it was found to have a free swelling ratio of 47 g/g and a low RTCD of 8%, show small strain under pressure, manifest satisfactory performance under pressure, possess of flexibility, and excel in performance.

Industrial Applicability

According to this invention, a porous cross-linked polymer material excelling in absorbancy and flexibility can be produced by incorporating in the monomer mixture a compound having a double bond equivalent of not less than 120 g/mol. Moreover, by using the compound having a double bond equivalent of not less than 120 g/mol, it is made possible to adjust the cross-link density and advance the occurrence of the gel point and eventually curtail the polymerizing time.

What is claimed is:

1. A method for the production of a porous cross-linked polymer material, the method comprising polymerizing a water-in-oil type high internal phase emulsion containing a cross-linking agent, characterized by at least one kind of said cross-linking agent being a compound having a double bond equivalent of not less than 120 g/mol.

2. The method of claim 1, wherein said cross-linking agent is a compound having an alkylene oxide moiety.

3. The method of claim 2, wherein said compound is a compound having an unsaturated carboxylic acid monomer bonded by ester linkage to an alkylene oxide adduct of a polyhydric alcohol.

4. The method of claim 2, wherein said compound is a compound represented by the following formula (I)

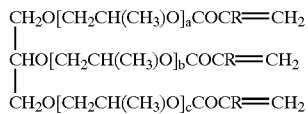

(I)

wherein the plurality of R's may be the same or different and are each hydrogen atom or a methyl group and a, b, and c are each 0 or an integer and satisfy $a+b+c \geqq 1$ or

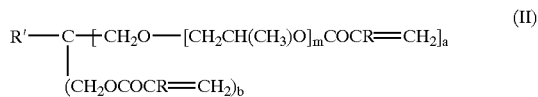

(II)

wherein the plurality of R's may be the same or different and are each a hydrogen atom or a methyl group, R' represents a methyl group or an ethyl group, m, a, and b are each 0 or an integer, and satisfy $m \geqq 1$ and $a+b=3$.

5. The method of claim 1, where said compound is a vinyl polymer containing not less than two polymerizing double bonds in the molecular unit.

6. The method of claim 5, wherein said vinyl polymer is a (meth)acryl cross-linked polymer.

* * * * *